(12) United States Patent
Nishida et al.

(10) Patent No.: US 6,180,282 B1
(45) Date of Patent: Jan. 30, 2001

(54) CATHODE FOR LITHIUM SECONDARY BATTERY

(75) Inventors: Yasunori Nishida, Ibaraki; Kenichiro Kami, Aichi; Kenji Nakane; Hitoshi Miura, both of Ibaraki, all of (JP)

(73) Assignee: Sumitomo Chemical Company, Limited, Osaka (JP)

( * ) Notice: Under 35 U.S.C. 154(b), the term of this patent shall be extended for 0 days.

(21) Appl. No.: 09/019,048

(22) Filed: Feb. 5, 1998

(30) Foreign Application Priority Data

Feb. 5, 1997 (JP) .................................................... 9-022471

(51) Int. Cl.$^7$ ...................................................... H01M 2/16
(52) U.S. Cl. .......................... 429/137; 429/212; 429/213; 429/215; 429/216; 429/217; 429/224; 429/231.95; 429/231.1
(58) Field of Search ..................... 429/212, 213, 429/215, 217, 231.95, 224, 216, 137, 231.1

(56) References Cited

U.S. PATENT DOCUMENTS

| | | | |
|---|---|---|---|
| 4,492,744 | * 1/1985 | Brown et al. | 429/217 |
| 5,597,658 | * 1/1997 | Kejha | 429/94 |
| 5,795,679 | * 8/1998 | Kawakami et al. | 429/218.1 |
| 5,869,208 | * 8/1998 | Miyasaka | 429/224 |

FOREIGN PATENT DOCUMENTS 0201875   11/1986   (JP) .

OTHER PUBLICATIONS

Patent Abstracts of Japan, vol. 096, No. 003, Mar. 29, 1996, JP07296847 A(1170–95).
Patent Abstracts of Japan, vol. 017, No. 375 (E–1397), Jul. 14, 1993, JP05062662A published Mar. 12, 1993.
Patent Abstracts of Japan, vol. 096, No. 004, Apr. 30, 1996, JP07335228A(Dec. 22, 1995).

* cited by examiner

*Primary Examiner*—Laura S. Weiner
(74) *Attorney, Agent, or Firm*—Sughrue, Mion, Zinn, Macpeak & Seas, PLLC

(57) ABSTRACT

A cathode for a lithium secondary battery wherein the surface of the cathode of which a composition containing a cathode active material, a conductive substance and a binder is supported on a current collector, is coated with at least one ion-permeable resin selected from resins having a temperature of deflection under load (measured at 18.6 kg/cm$^2$ load according to JIS K 7207) not lower than 100 ° C., provide a lithium secondary battery with high energy density having improved safety.

7 Claims, 2 Drawing Sheets

CATHODE FOR LITHIUM SECONDARY BATTERY

BACKGROUND OF THE INVENTION

1. Field of the Invention

The present invention relates to a cathode for a lithium secondary battery and a process for producing the same.

2. Description of the Related Art

In recent years, portable information instruments, such as a personal computer, a portable telephone and an information terminal, have been widely used. Since these instruments have various multimedia functions, the secondary battery used for such instrument as power supply is demanded to be small and light having a large capacity, namely, to have a high energy density. In this regard, aqueous secondary batteries, such as a lead-acid battery and a nickel-cadmium battery conventionally used, are not sufficient. Lithium secondary batteries which can attain a higher energy density, especially the lithium secondary batteries using as a cathode active material, lithium composite oxide such as lithiated cobalt dioxide, lithiated nickel dioxide, and spinel lithium manganese oxide, and as an anode active material, a carbonaceous material that can be doped/undoped with lithium ions, have been developed.

Since these lithium secondary batteries have inherently a large energy, maximum safety against abnormalities, such as an internal short circuit and an external short circuit, is required. Especially, in case of the severe safety test such as a nail penetration test or a crush test which causes the internal short circuit with local heat-generation, the charged cathode active material decomposes and releases oxygen causing another heat-generation. It is found that when the separator consisting of olefin resins such as polyethylene or polypropylene exists near the cathode electrode at the short circuit section, the separator is oxidized by the oxygen which is released from the cathode active material and that it causes s remarkable heat-generation which may result in an uncontrollable exothermic reaction.

On the other hand, in case of the separator comprising a heat-resistant resin alone such as fluororesin and the like, the shut-down function does not work, and a sufficient safety may not be kept against the internal heating accompanied by a large current charging/discharging or an external heating. Moreover, in case of the separator comprising two piled films of a heat-resistant resin and an olefin resin conventionally used, the separator becomes thick, and the amount of the active material which can be contain in a battery case decreases, and therefore the battery capacity decreases. Furthermore, the separator comprising two piled films increases the battery resistance, and results in further capacity drop in use at the large current.

It is described in JP-A 7-296847 that safety can be improved by forming a thin film of an ion-permeable polymer comprising fluororesin on a surface of a cathode. However, there is a problem that the heat resistance is not enough in case of the battery with high capacity using, for example, lithiated nickel dioxide as a cathode active material.

SUMMARY OF THE INVENTION

The purpose of the present invention is to provide a cathode for a lithium secondary battery of a high energy density and of a higher safety, and a process for producing the same, and a lithium secondary battery using the cathode.

As a result of intensive studies, the present inventors found that a lithium secondary battery of a high energy density having improved safety against an external or internal short circuit can be obtained by coating the surface of the cathode for the lithium secondary battery with a specific ion-permeable resin, and thus completed the present invention.

That is, the present invention is:

(1) A cathode for a lithium secondary battery wherein the surface of the cathode of which a composition containing a cathode active material, a conductive substance and a binder is supported on a current collector, is coated with at least one ion-permeable resin selected from resins having a temperature of deflection under load (measured at 18.6 kg/cm$^2$ load according to JIS K 7207) not lower than 100° C.

(2) A process for producing the cathode for a lithium secondary battery of (1), wherein a solution of the ion-permeable resin is coated on a cathode surface, the ion-permeable resin is then deposited by immersing the cathode in a poor solvent for the ion-permeable resin, and dried.

(3) A process for producing the cathode for a lithium secondary battery of (1), wherein a solution of the ion-permeable resin is coated on a cathode surface, then the ion-permeable resin is deposited by exposing the cathode to a high humidity atmosphere, and dried.

(4) A lithium secondary battery comprising; a cathode including a lithium composite oxide as a cathode active material; an anode including, as an active material, a lithium metal, a lithium alloy or a material that can be doped/undoped with lithium ions; and a liquid or solid electrolyte, wherein the cathode of (1) is used as a cathode for a lithium secondary battery.

Figure 1:
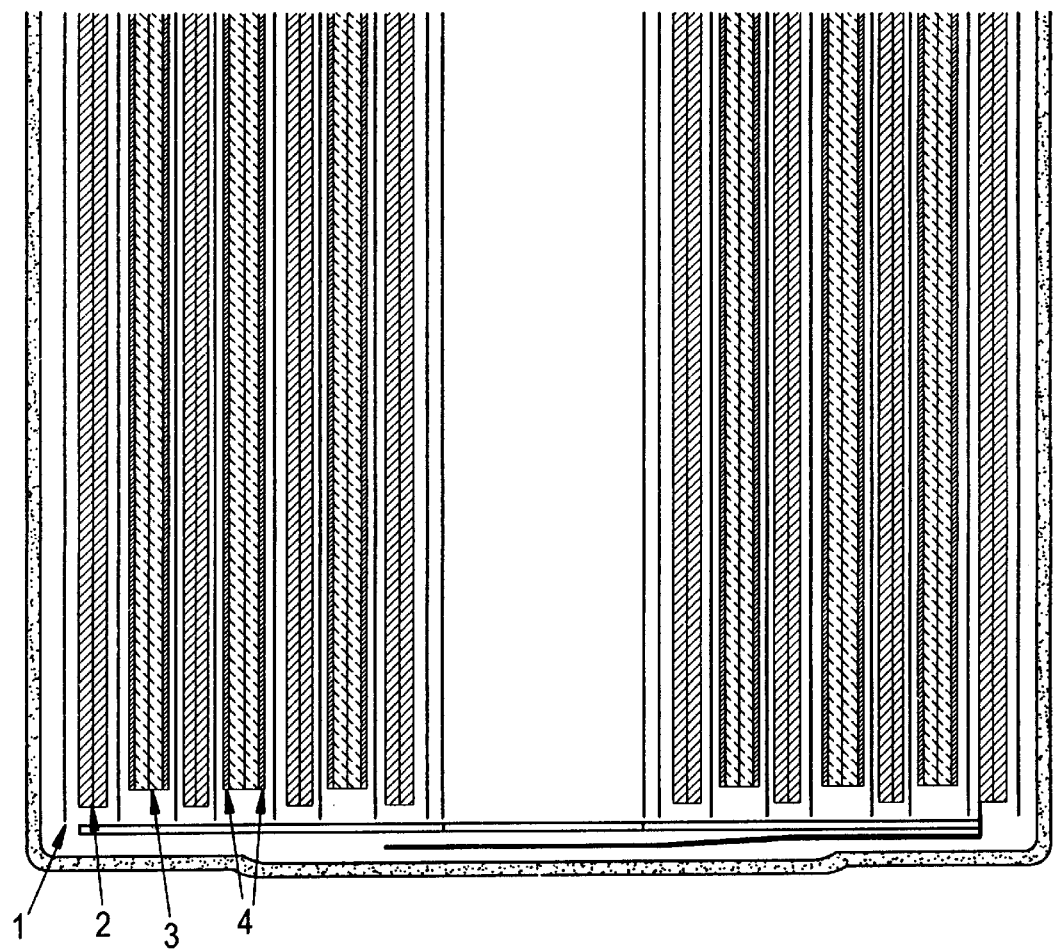
FIG. 1 is a sectional view of a lithium secondary battery in Example 1.
Figure 2:
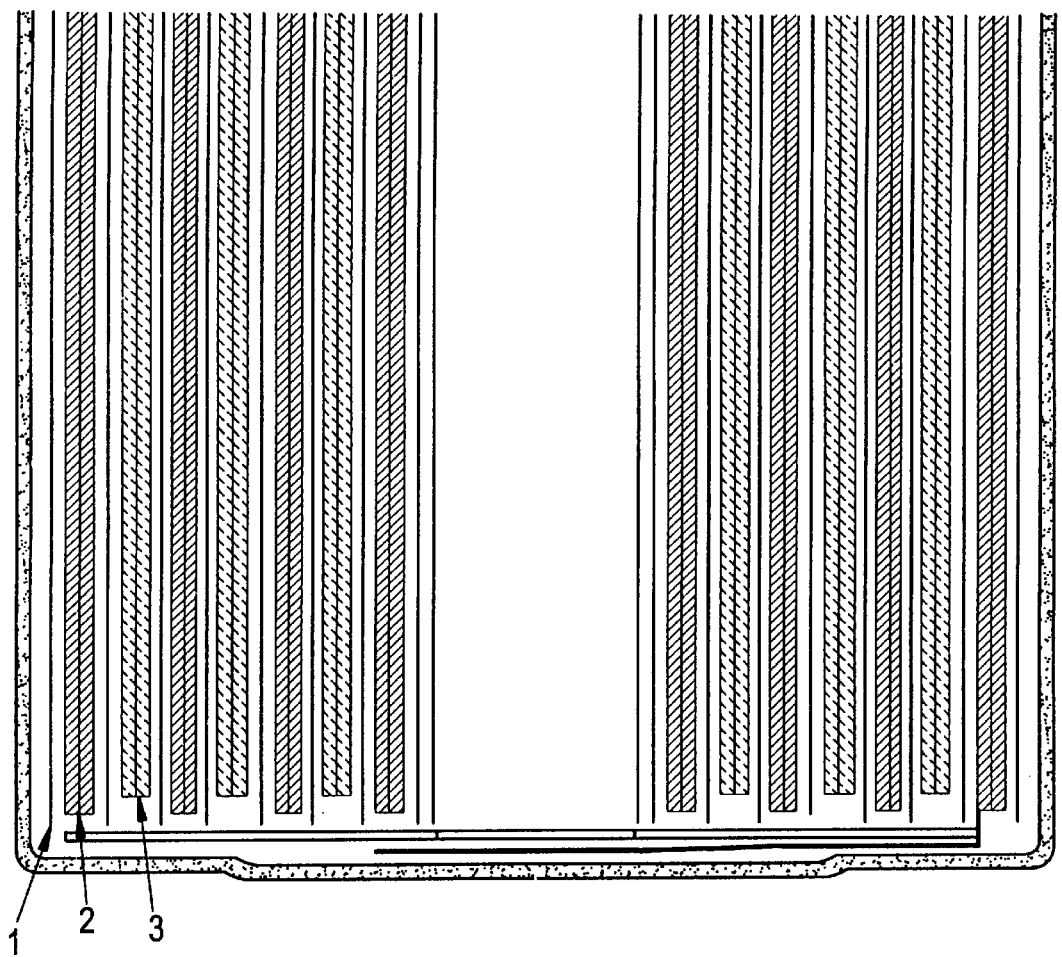
FIG. 2 is a sectional view of a lithium secondary battery in Comparative Example 1.

1: Separator
2: Anode
3: Cathode
4: Ion-permeable resin

DETAILED DESCRIPTION OF THE INVENTION

The cathode for a lithium secondary battery of the present invention is characterized by the structure that the surface of the cathode of which a composition containing a cathode active material, a conductive substance and a binder is supported on a current collector, is coated with at least one ion-permeable resin selected from resins having a temperature of deflection under load (measured at 18.6 kg/cm$^2$ load according to JIS K 7207) not lower than 100° C. To be safe also under a high temperature in severe use, the cathode for a lithium secondary battery of the present invention, is preferably coated with an ion-permeable resin of at least one selected from resins having a temperature of deflection under load not lower than 200° C.

A test piece is heated at a rate of 2° C./min. with adding a load of 18.5 kgf/cm$^2$ thereon. The temperature of deflection under load is the temperature when the deflection of the test piece has reached the standard deflection.

Examples of the resin having a temperature of deflection under load not lower than 100° C. include polyimide, polyamide-imide, aramid, polycarbonate, polyacetal, polysulfone, poly(phenylene sulfide), polyetheretherketone, aromatic polyester, polyethersulfone, polyetherimide, and the like.

Examples of the resin having a temperature of deflection under load not lower than 200° C. include polyimide, polyamide-imide, aramid, polyethersulfone, polyetherimide, and the like. As the ion-permeable resin, it is especially preferable to be selected from the group consisting of polyimide, polyamide-imide and aramid. The ion-permeable resin is preferable to be soluble in a solvent.

The ion-permeable resin is a resin having a micro-porous structure, and the porosity is preferably 30 to 80% by volume, and more preferably 40 to 70% by volume. The film thickness of the ion-permeable resin coated on a cathode is preferably 1 to 30 μm, and more preferably 5 to 15 μm.

The film thickness less than 1 μm for the ion-permeable resin is not preferable, since the strength may not be sufficient. And the film thickness more than 30 μm for the ion-permeable resin is not preferable, since the amount of the active material which can be contained in a battery decreases and the battery capacity drops.

In the present invention, examples of the method of coating a cathode surface with the ion-permeable resin include; a process, wherein a solution of the ion-permeable resin is coated on the cathode surface, the ion-permeable resin is then deposited by immersing the cathode in a poor solvent for the ion-permeable resin, and dried; and a process, wherein a solution of the ion-permeable resin is coated on the cathode surface, then the ion-permeable resin is deposited by exposing the cathode to a high humidity atmosphere, and dried. Here, as a high humidity atmosphere, the atmosphere having 60% or more of relative humidity is preferable.

In order to adjust the porosity of the ion-permeable resin film, the resultant cathode may be further compressed by a roll-press and the like.

Examples of the solvent for the ion-permeable resin include N-methyl-2-pyrrolidone (which may hereinafter be referred to as "NMP"), N-N-dimethyl acetamide, dimethyl sulfoxide, N-N-dimethylformamide, cresol, chloroform, tetrahydrofuran, toluene, xylene, diglyme, o-chlorophenol and the like.

Although aramid resin after polymerization does not dissolve in the above solvents, when aramid is used as an ion-permeable resin, aramid solution can be obtained by dissolving in a solvent before polymerization and then polymerizing. As a method for obtaining the aramid solution, it is mentioned that calcium chloride is dissolved in NMP, next p-phenylenediamine is dissolved, then terephthalic acid dichloride is gradually added and finally the solution is aged.

Examples of the poor solvent for the ion-permeable resin include water, alcohols such as ethanol, methanol and isopropanol, ketones such as acetone and methyl ethyl ketone.

As for the structure of the cathode for the lithium secondary battery of the present invention, a composition containing a cathode active material, a conductive substance and a binder is supported on a current collector.

The cathode comprising a material that can be doped/undoped with lithium ions as the cathode active material, a carbonaceous material and the like as a conductive substance, and a thermoplastic resin and the like as a binder, can be used.

Examples of the material that can be doped/undoped with lithium ions include a lithium composite oxide containing at least one transition metal, such as V, Mn, Fe, Co and Ni and the like. The lithium composite oxide having an alpha-NaFeO$_2$ structure such as lithiated nickel dioxide and lithiated cobalt dioxide or a spinel structure such as spinel lithium manganese oxide is preferable, since the mean charging/discharging potential is high.

The lithium composite oxide can also contain various added elements. It is preferable that the lithiated nickel dioxide containing at least one element selected from the group consisting of Ti, V, Cr, Mn, Fe, Co, Cu, Ag, Mg, Al, Ga, In and Sn is used in an amount of 0.1 to 20% by mole to the sum of the molar amount of said metals and the molar amount of nickel in the lithiated nickel dioxide, since the cycle characteristic using at a high capacity is improved.

Examples of the thermoplastic resin used as the binder include poly (vinylidene fluoride) (which may hereinafter be referred to as "PVDF"), vinylidene fluoride copolymer, polytetrafluoroethylene, tetrafluoroethylene-hexafluoropropylene copolymer, tetrafluoroethylene-perfluoroalkylvinylether copolymer, ethylene-tetrafluoroethylene copolymer, tetrafluoroethylene-hexafluoropropylene-vinylidene fluoride copolymer, thermoplastic polyimide, polyethylene, polypropylene and the like.

Examples of the carbonaceous material as the conductive substance include natural graphite, artificial graphite, cokes, carbon black and the like. Such conductive substances may be used alone or in combination as a composite conductive substance, such as of artificial graphite and carbon black.

The lithium secondary battery of the present invention is characterized by using the above-mentioned cathode for a lithium secondary battery described in (1), wherein the lithium secondary battery comprising a cathode including a lithium composite oxide as a cathode active material, an anode including, as an active material, a carbonaceous material that can be doped/undoped with lithium ions, a lithium metal or a lithium alloy, and a liquid or solid electrolyte.

The anode of the lithium secondary battery of the invention includes a lithium metal, a lithium alloy or a material that can be doped/undoped with lithium ions. Examples of the material that can be doped/undoped with lithium ions include carbonaceous materials such as natural graphite, artificial graphite, cokes, carbon black, pyrolytic carbons, carbon fibers, fired products of organic polymer compounds and the like; and a chalcogen compound such as oxide and sulfide, which can be doped/undoped with lithium ions at lower potentials than in the cathode. A carbonaceous material including a graphite material such as natural graphite and artificial graphite as a main component is preferred, because the combination of such a carbonaceous material and a cathode provides a high energy density due to the flatness of their charging/discharging potential and the low average working potential.

As to a combination of the anode with a liquid electrolyte, in case where the liquid electrolyte does not contain ethylene carbonate, an anode containing poly(ethylene carbonate) (which may hereinafter be referred to as "PEC") is preferably used to improve the cycle characteristic and the large-current discharging characteristic of the battery.

The carbonaceous material can be in any shape including a flaky shape like natural graphite, a spherical shape like mesocarbon micro-beads, a fibrous shape like graphitized carbon fiber and an agglomerate of fine powders. If required, a thermoplastic resin can be added as a binder to the carbonaceous material. Examples of a usable thermoplastic resin include PVDF, vinylidene fluoride copolymer, tetrafluoroethylene-hexafluoropropylene-vinylidene fluoride copolymer, thermoplastic polyimide, polyethylene, polypropylene and the like.

Examples of the chalcogen compound such as oxide and sulfide used as the anode, include crystalline or amorphous oxides comprised of a group XIII element, a group XIV element or a group XV element of the periodic law, such as amorphous compounds essentially comprised of tin oxides. Similarly to the above, there can be added, as required, a carbonaceous material as the conductive substance, or a thermoplastic resin as the binder.

Examples of a usable anode current collector include copper, nickel, stainless steel and the like. Above all, copper is preferably used in the lithium secondary battery because Cu hardly combines with lithium to form an alloy and is readily processed into a thin film. The composition containing the anode active material may be applied to the anode current collector by various methods, such as press forming. Alternatively, the composition may be pasted by the use of a solvent or the like, applied to the current collector, dried and adhered thereto by pressing.

Examples of a separator employed by the lithium secondary battery according to the invention include micro-porous films made of olefin resins such as polyethylene, polypropylene and the like; and unwoven or woven fabrics such as of nylon. In the light of a higher energy density per volume and a smaller internal resistance, the separator preferably has the smallest possible thickness as long as the mechanical strength is secured. A preferred thickness thereof is in the range between 10 and 30 $\mu$m.

Examples of the electrolyte employed by the lithium secondary battery according to the invention include a nonaqueous electrolyte solution in which a lithium salt is dissolved in an organic solvent, and any one of the known solid electrolytes. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic lithium carboxylate, $LiAlCl_4$ and the like. These salts may be used alone or in combination thereof it is preferred to use at least one of the salts containing fluorine or at least one salt selected from a group consisting of $LiPF_6$, $LiAsF_6$, $LiSbF_6$, $LiBF_4$, $LiCF_3SO_3$, $LiN(CF_3SO_2)_2$ and $LiC(CF_3SO_2)_3$.

Examples of the organic solvent usable for the lithium secondary battery according to the invention include carbonates such as propylene carbonate, ethylene carbonate, dimethyl carbonate, diethyl carbonate, ethyl methyl carbonate, 4-trifluoromethyl-1,3-dioxolane-2-one, 1,2-di(methoxycarbonyloxy)ethane and the like; ethers such as 1,2-dimethoxyethane, 1,3-dimethoxypropane, pentafluoropropyl methyl ether, 2,2,3,3-tetrafluoropropyl difluoromethyl ether, tetrahydrofuran, 2-methyl tetrahydrofuran and the like; esters such as methyl formate, methyl acetate, $\gamma$-butyrolactone and the like; nitriles such as acetonitrile, butyronitrile and the like; amides such as N,N-dimethylformamide, N,N-dimethylacetoamide and the like; carbamates such as 3-methyl-2-oxazolidone and the like; sulfur-containing compounds such as sulfolane, dimethylsulfoxide, 1,3-propane sultone and the like; and the above organic solvents with a substituent including fluorine introduced therein. Normally, two or more compounds of the above are used in combination. Above all, a mixed solvent containing a carbonate is preferred and more preferred is a mixed solvent of a cyclic carbonate and a non-cyclic carbonate or of a cyclic carbonate and an ether.

As the mixed solvent of a cyclic carbonate and a non-cyclic carbonate, preferred is a mixed solvent containing ethylene carbonate, dimethyl carbonate and ethyl methyl carbonate, because such a mixed solvent provides a wide operating temperature range, an excellent drain capability and hardly decomposes even when the graphite material such as natural graphite and artificial graphite is used as an anode active material.

Examples of a usable solid electrolyte include polymer electrolytes such as polyethylene oxide polymer compounds and polymer compounds containing at least one of a polyorganosiloxane branch or polyoxyalkylene branch; sulfide electrolytes such as of $Li_2S-SiS_2$, $Li_2S-GeS_2$, $Li_2S-P_2S_5$, $Li_2S-B_2S_3$ and the like; and inorganic compound electrolytes comprising sulfides such as $Li_2S-SiS_2-Li_3PO_4$, $Li_2S-SiS_2-Li_2SO_4$ and the like. Additionally, also usable is a so-called gel-type electrolyte in which a nonaqueous liquid electrolyte is maintained by a polymer.

It is to be noted that the lithium secondary battery according to the invention is not particularly limited in shape and may have any one of the shapes such as a paper-sheet shape, a coin-like shape, a cylindrical shape and a rectangular parallelepiped shape.

EXAMPLES

Although the examples of the invention will hereinbelow be described in detail, it is to be noted that the invention should not be limited to these examples.

Example 1

(1) Preparation of Cathode Sheet

To a mixture of an active material of lithiated nickel dioxide powder and conductive substance of powdery artificial graphite and acetylene black, there was added an NMP solution containing PVDF as a binder in a ratio of active material: artificial graphite: acetylene black: PVDF= 87:9:1:3 (weight ratio). The resultant mixture was kneaded to obtain a paste of cathode composition. The resultant paste was coated on the predetermined portions of both sides of aluminum foil as a current collector having a thickness of 20 $\mu$m, then dried and roll-pressed, and the cathode sheet was obtained.

(2) Coating by an Ion-Permeable Resin

A polyimide varnish [RIKACOAT-SN20 (the resin content of 20% by weight in NMP solution) from New Japan Chemical Co., Ltd.; the temperature of deflection under load of the resin at the time of 18.6 kg/cm$^2$ load according to JIS K 7207 is about 300° C.] was diluted by NMP to the resin content of 10% by weight.

After coating it on the above-mentioned cathode sheet with a doctor-blade, the polyimide resin was deposited by immersing in acetone and dried. Then the cathode sheet of which surface was coated with the ion-permeable resin was obtained.

The thickness of the ion-permeable resin film which coated the surface of the cathode sheet was 8 $\mu$m, and the porosity was 65% by volume.

(3) Preparation of Anode Sheet

An active material of graphitized carbon fiber and an NMP solution containing PVDF as a binder and the PEC having a number average molecular weight of 50000, were mixed together in a ratio of active material: PVDF: PEC= 90:8:2 (weight ratio).

The resultant mixture was kneaded to obtain a paste of anode composition. The resultant paste was coated on the predetermined portions of both sides of copper foil as a current collector having a thickness of 10 $\mu$m, then dried and roll-pressed, and the anode sheet was obtained.

The cathode sheet and the anode sheet thus prepared and a separator formed of a 25 µm-thick polyethylene microporous film were laminated in the order of the anode, the separator, the cathode and the separator, so as to form a lamination. The lamination was wound into a roll to form an electrode assembly shaped like a volute in section.

The aforesaid electrode assembly was inserted in a battery can in which the electrode assembly was impregnated with a nonaqueous electrolyte comprising a 50:50 mixed solution of dimethyl carbonate and 2,2,3,3-tetrafluoropropyl difluoromethyl ether having $LiPF_6$ dissolved therein in a concentration of 1 mol/l. Subsequently, a battery lid also serving as a cathode terminal with a safety vent was crimped onto the battery can and thus was obtained a cylindrical battery of 18650 size.

Using two cylindrical batteries thus obtained, after having performed 150% charge of the rated capacity to make an overcharged state, a nail penetration test was carried out.

The nail penetration test was performed according to the guideline for safety evaluation on secondary lithium cells (from Battery Association of Japan; SBA-G 1101-1995).

As a result, the batteries did not show a remarkable internal pressure rise, and neither burst nor ignition occurred, in spite of the severe state of overcharge.

Comparative Example 1

The cylindrical battery of 18650 size was obtained in the same manner with example 1, without forming the ion-permeable film of an ion-permeable resin on the cathode surface.

Using two cylindrical batteries thus obtained, after having performed 150% charge of the rated capacity to make an overcharged state, a nail penetration test was carried out. As a result, the batteries showed a remarkable internal pressure rise.

The lithium secondary battery of the present invention has a high energy density, the safety is improved further against the local short circuit represented by such as a nail penetration test or a crush test, and the industrial value is very high.

What is claimed is:

1. A cathode for a lithium secondary battery comprising:
   a composition containing a cathode active material, a conductive substance and a binder; and
   a current collector,
   said composition being supported on said current collector,
   wherein said cathode active material comprises a lithium composite oxide and wherein a surface of said cathode is coated with at least one ion-permeable resin having a temperature of deflection under load (measured at 18.6 kg/cm² load according to JIS K 7207) of not lower than 100° C.

2. A cathode for a lithium secondary battery according to claim 1, wherein said temperature of deflection under load of said ion-permeable resin is not lower than 200° C.

3. A cathode for a lithium secondary battery according to claim 1 or 2, wherein said ion-permeable resin is selected from the group consisting of a polyimide resin, a polyamide-imide resin, an aramid resin, and mixtures thereof.

4. A cathode for a lithium secondary battery according to claim 1, wherein said ion-permeable resin has porosity of 30 to 80% by volume.

5. A lithium secondary battery, comprising:
   a cathode;
   an anode comprising, as an active material, a lithium metal, a lithium alloy or a material that can be doped/undoped with lithium ions; and
   a liquid or solid electrolyte,
   wherein said cathode comprises:
      a composition containing a cathode active material comprising a lithium composite oxide, a conductive substance and a binder; and
      a current collector,
      said composition being supported on said current collector, and a surface of said cathode being coated with at least one ion-permeable resin having a temperature of deflection under load (measured at 18.6 kg/cm² load according to JIS K 7207) of not lower than 100° C.

6. A process for producing a cathode for a lithium secondary battery, said cathode comprising:
   a composition containing a cathode active material, a conductive substance and a binder; and
   a current collector,
   said composition being supported on said current collector,
   comprising the steps of:
      coating a solution of an ion-permeable resin having a temperature of deflection under load (measured at 18.6 kg/cm² load according to JIS K 7207) of not lower than 100° C. on a surface of said cathode;
      immersing the cathode in a poor solvent for said ion-permeable resin; and drying said coated cathode.

7. A process for producing a cathode for a lithium secondary battery, said cathode comprising:
   a composition containing a cathode active material, a conductive substance and a binder;
   and a current collector,
   said composition being supported on said current collector,
   comprising the steps of:
      coating a solution of an ion-permeable resin having a temperature of deflection under load (measured at 18.6 kg/cm² load according to JIS K 7207) of not lower than 100° C. on a surface of said cathode;
      exposing the cathode to an atmosphere having at least 60% relative humidity and drying the coated cathode.

* * * * *